(12) United States Patent
Mohan

(10) Patent No.: US 11,429,727 B2
(45) Date of Patent: Aug. 30, 2022

(54) STATIC SECURITY SCANNER FOR APPLICATIONS IN A REMOTE NETWORK MANAGEMENT PLATFORM

(71) Applicant: ServiceNow, Inc., Santa Clara, CA (US)

(72) Inventor: Pavan Mohan, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 216 days.

(21) Appl. No.: 16/923,049

(22) Filed: Jul. 7, 2020

(65) Prior Publication Data
US 2020/0342114 A1    Oct. 29, 2020

Related U.S. Application Data

(63) Continuation of application No. 15/716,696, filed on Sep. 27, 2017, now Pat. No. 10,719,611.

(51) Int. Cl.
*G06F 21/57* (2013.01)
*H04L 9/40* (2022.01)

(52) U.S. Cl.
CPC ........ *G06F 21/577* (2013.01); *H04L 63/1433* (2013.01); *G06F 2221/033* (2013.01); *H04L 63/02* (2013.01)

(58) Field of Classification Search
CPC ............. G06F 21/577; G06F 2221/033; H04L 63/1433; H04L 63/02
See application file for complete search history.

(56) References Cited

U.S. PATENT DOCUMENTS

| | | |
|---|---|---|
| 6,188,400 B1 | 2/2001 | House |
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

OTHER PUBLICATIONS

Song-Kyoo Kim, et al., Advanced Networked Server Management and Operational Implementations, Apr. 2010, 2010 Second International conference on Computer and Network Technology, pp. 105-109.

(Continued)

*Primary Examiner* — Meng Li
(74) *Attorney, Agent, or Firm* — Fletcher Yoder P.C.

(57) ABSTRACT

An example embodiment may involve a remote network management platform including a computational instance hosting a particular application. The particular application may be based on a unit of program code, use one or more database tables, and define one or more user roles with respect to accessing the program code and the database tables. A scanner application may be configured to: receive, from a client device, a request to scan the particular application; retrieve the particular application; conduct a static security scan by applying a set of rules that define security vulnerabilities, where the rules take into account (i) relationships between the user roles and the unit of program code, and (ii) relationships between the user roles and the database table; and transmit, to the client device, a representation of a web page that contains observed security vulnerabilities of the particular application.

20 Claims, 16 Drawing Sheets

CLIENT DEVICE 800

(1) REQUEST SCAN OF CUSTOM APPLICATION 806 ON COMPUTATIONAL INSTANCE 804

(5) WEB PAGE WITH SCAN RESULTS

SCANNER APPLICATION 802

(2) REQUEST CODE AND USER ROLES OF CUSTOM APPLICATION 806, DATABASE TABLES 808

(3) CODE AND USER ROLES OF CUSTOM APPLICATION 806, DATABASE TABLES 808

(4) PERFORM REQUESTED SCAN

COMPUTATIONAL INSTANCE 804

CUSTOM APPLICATION 806

DATABASE TABLES 808

(56) References Cited

U.S. PATENT DOCUMENTS

| | | |
|---|---|---|
| 7,254,786 B2 | 8/2007 | Henriquez |
| 7,610,512 B2 | 10/2009 | Gerber |
| 7,617,073 B2 | 11/2009 | Trinon |
| 7,627,543 B2 | 12/2009 | Lock |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,489,872 B1 | 7/2013 | Kapoor |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,966,110 B2 | 2/2015 | Lippincott |
| 9,032,520 B2 | 5/2015 | Banzhof |
| 9,104,859 B1 | 8/2015 | Banerjee |
| 9,239,857 B2 | 1/2016 | Trinon |
| 9,447,969 B2 | 9/2016 | Recourt et al. |
| 9,535,737 B2 | 1/2017 | Joy |
| 9,578,063 B1 | 2/2017 | Iyer |
| 9,792,387 B2 | 10/2017 | George |
| 2003/0051154 A1 | 3/2003 | Barton |
| 2006/0167799 A1 | 7/2006 | Wehunt |
| 2007/0162749 A1 | 7/2007 | Lim |
| 2007/0169149 A1 | 7/2007 | Jennings |
| 2009/0100518 A1 | 4/2009 | Overcash |
| 2009/0300711 A1* | 12/2009 | Tokutani .............. G06F 21/6218 726/1 |
| 2010/0007928 A1 | 1/2010 | Kashioka |
| 2010/0049687 A1* | 2/2010 | Patten ...................... G06N 5/02 726/1 |
| 2014/0343989 A1* | 11/2014 | Martini ................. H04L 63/104 705/7.17 |
| 2015/0026208 A1* | 1/2015 | Kuhmuench ......... G06F 21/629 707/769 |
| 2017/0289191 A1 | 10/2017 | Thioux |
| 2017/0302701 A1* | 10/2017 | Phanse .................... H04L 63/20 |
| 2018/0176245 A1* | 6/2018 | Cornell .................. G06F 21/577 |
| 2019/0036864 A1* | 1/2019 | Reuss .................... G06Q 20/10 |

OTHER PUBLICATIONS

S.E. El-khamy, et al., A novel squeezable eliptical antenna array for sector scanning remote sensing applications; Aug. 2002; IGARSS '98; Sensing and Managing the Environment. 1998 IEEE International Geoscience and Remote Sensing Symposium Proceedings. (Cat. No. 98CH36174), pp. 1-3.

* cited by examiner

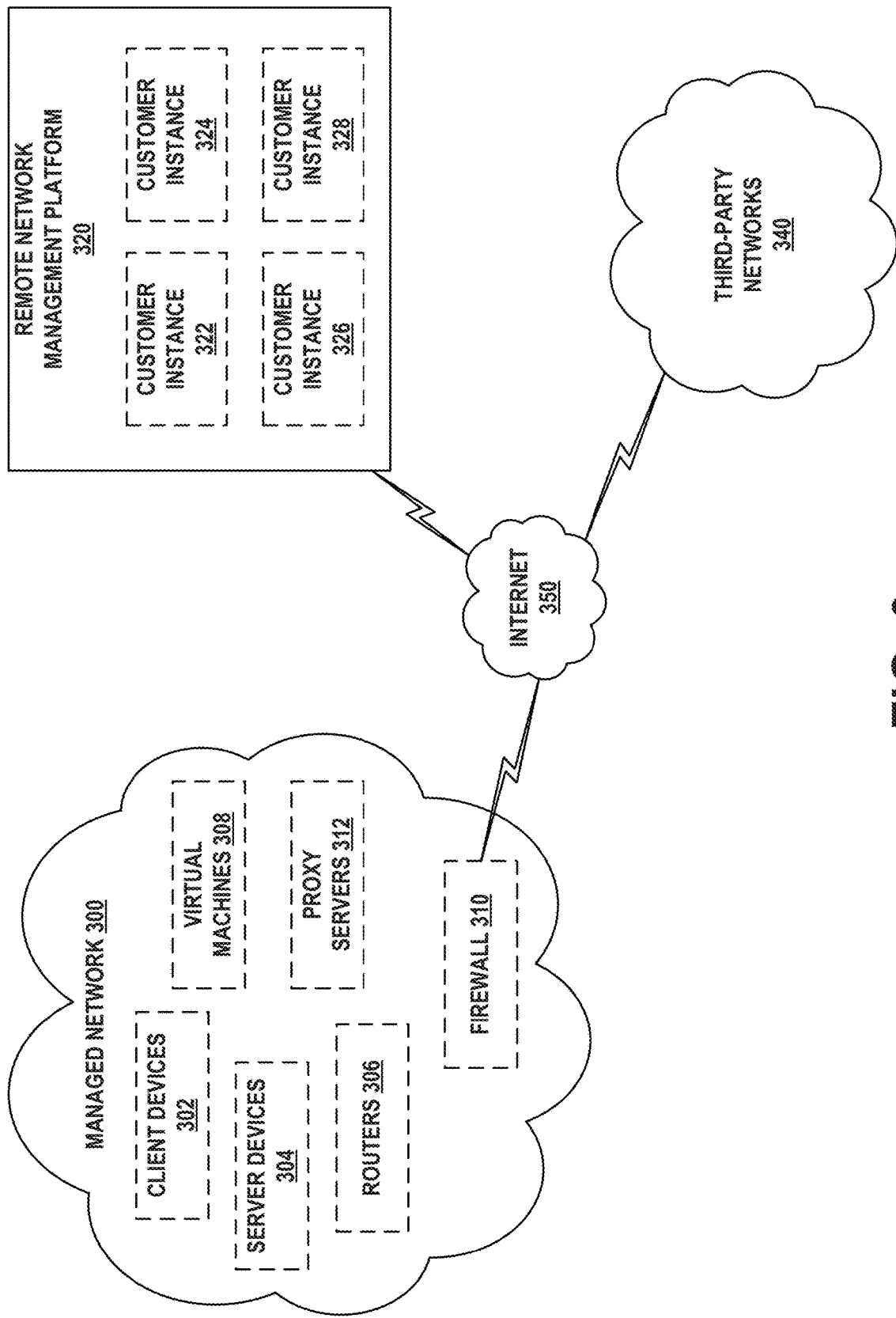

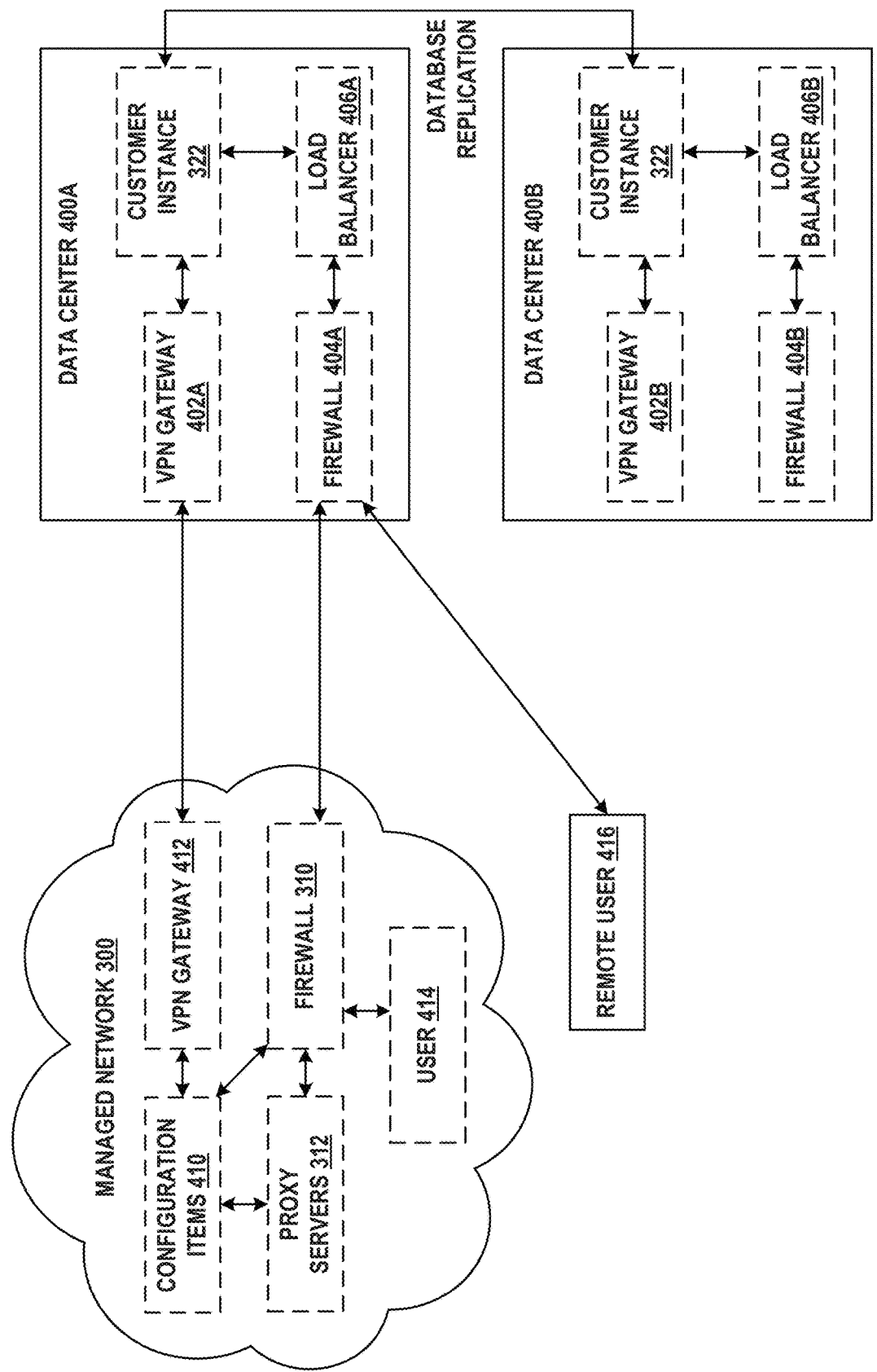

SCANNER V1.0

CUSTOM APPLICATION: F77E8D474FF8AA00693F46

▲ 3 CUSTOM USER ROLES

*USER ROLE*      *DERIVED FROM*
    ADMINISTRATOR
    BASIC_USER      BASIC_USER
    INTEGRATION      ADMINISTRATOR, BASIC_USER

▲ 3 TABLES
▲ 1 CLIENT CALLABLE SCRIPT INCLUDE
▲ 1 PROCESSOR
▲ 2 UI PAGES
▲ 1 SCRIPTED REST API
▲ 1 UI ACTION
▲ 1 PROPERTY
▲ 1 SERVER SIDE INCLUDE INJECTION
▲ 1 PUBLIC PAGE
▲ 1 OPEN REDIRECTION
▲ SENSITIVE SCRIPTS

SCANNER V1.0

CUSTOM APPLICATION: F77E8D474FF8AA00693F46

▲ 3 CUSTOM USER ROLES
▲ 3 TABLES

| TABLE | PERMISSIONS | USER ROLE |
|---|---|---|
| APP.CONFIG | CREATE | BASIC_USER |
| APP.CONFIG | READ | BASIC_USER |
| APP.CONFIG | WRITE | BASIC_USER |
| APP.CONFIG | DELETE | BASIC_USER |
| APP.TRANSACTIONS | CREATE | BASIC_USER |
| APP.TRANSACTIONS | READ | BASIC_USER (<LINK>) |
| APP.TRANSACTIONS | WRITE | ADMINISTRATOR |
| APP.TRANSACTIONS | DELETE | ADMINISTRATOR |
| APP.ALERT | READ | BASIC_USER |
| APP.ALERT | READ | |

▲ 1 CLIENT CALLABLE SCRIPT INCLUDE
▲ 1 PROCESSOR
▲ 2 UI PAGES
▲ 1 SCRIPTED REST API
▲ 1 UI ACTION
▲ 1 PROPERTY
▲ 1 SERVER SIDE INCLUDE INJECTION
▲ 1 PUBLIC PAGE
▲ 1 OPEN REDIRECTION
▲ SENSITIVE SCRIPTS

SCANNER V1.0

CUSTOM APPLICATION: F77E8D474F8AA00693F46

| TYPE | FUNCTION | PARAMETERS | USER ROLE |
|------|----------|------------|-----------|
| AJAX | TRANSFER_MONEY: PROCESS() | VAR FROM_ACCT = THIS.GETPARAM('SYSPARAM_FROM'); VAR TO_ACCT = THIS.GETPARAM('SYSPARAM_TO'); VAR AMOUNT = THIS.GETPARAM('AMOUNT'); | BASIC_USER |

▲ 3 CUSTOM USER ROLES
▲ 3 TABLES
▲ 1 CLIENT CALLABLE SCRIPT INCLUDE

▲ 1 PROCESSOR
▲ 2 UI PAGES
▲ 1 SCRIPTED REST API
▲ 1 UI ACTION
▲ 1 PROPERTY
▲ 1 SERVER SIDE INCLUDE INJECTION
▲ 1 PUBLIC PAGE
▲ 1 OPEN REDIRECTION
▲ SENSITIVE SCRIPTS

SCANNER V1.0

CUSTOM APPLICATION: F77E8D474FF8AA00693F46

- ▲ 3 CUSTOM USER ROLES
- ▲ 3 TABLES
- ▲ 1 CLIENT CALLABLE SCRIPT INCLUDE
- ▲ 1 PROCESSOR
- ▲ 2 UI PAGES
- ▲ 1 SCRIPTED REST API
- ▲ 1 UI ACTION
- ▲ 1 PROPERTY
- ▲ 1 SERVER SIDE INCLUDE INJECTION
- ▲ 1 PUBLIC PAGE
- ▲ 1 OPEN REDIRECTION
- ▲ SENSITIVE SCRIPTS

| KEYWORD | LOCATION | USAGE |
|---|---|---|
| PASSWORD | <LINK> | VAR PASSWORD = "ADMIN"; |
| PW | | |
| PWD | | |
| USERNAME | <LINK> | VAR USERNAME = "ADMIN"; |
| TOKEN | | |
| API | | |
| API_KEY | | |
| APIKEY | | |

STATIC SECURITY SCANNER FOR APPLICATIONS IN A REMOTE NETWORK MANAGEMENT PLATFORM

CROSS REFERENCE TO RELATED APPLICATIONS

This disclosure is a continuation of and claims priority to U.S. patent application Ser. No. 15/716,696, filed on Sep. 27, 2017, which is herein incorporated by reference in their entireties.

BACKGROUND

Remote network management platforms allow computer networks to be managed by way of cloud-based devices and services. Advantageously, these architectures simplify the provisioning and administration of managed networks, and may provide mechanisms with which operational workflows can be defined and used. In some cases, a remote network management platform may allow users to write, develop, and deploy their own custom applications that leverage the platform's existing middleware, database, and user interface components.

There is a possibility that custom applications may access (or attempt to access) sensitive information, such as bank account numbers, credit card numbers, social security numbers, personal identification numbers, and so on. Thus, it is desirable for these custom applications to audited for potential security issues prior to deployment. But when operating on a particular remote network management platform, custom applications may use the platform's particular libraries and database tables, and may adhere to particular coding conventions. This makes any such audit more challenging and potentially requiring an intimate knowledge of the platform in order to be effective.

SUMMARY

The embodiments herein include a static security scanner for auditing custom applications developed for use with a remote network management platform. The scanner is a program that allows an administrator of the remote network management platform to retrieve a copy of the custom application, the database tables that the custom application can access, and the roles of users that may have access to the database tables. Then, the scanner applies a series of rules to determine whether there are known security vulnerabilities in the custom application. For example, the scanner may attempt to identify public web pages, open redirections, client-side script includes, server-side includes injection, improper access control lists (ACLs), and so on. The results of the scan may be displayed to the administrator on one or more web pages arranged in an intuitive fashion. For instance, potential problems may be clearly identified by category. From the web page, the administrator may be able to view code of the custom application or database tables accessed thereby to further evaluate the significance of the potential problems.

Accordingly, a first example embodiment may involve a remote network management platform including a computational instance associated with a managed network. The computational instance may host a particular application. The particular application may be based on a unit of program code, use one or more database tables, and define one or more user roles with respect to accessing the program code and the database tables. The remote network management platform may include a scanner application executable on the remote network management system, where the scanner application may be configured to: receive, from a client device, a request to scan the particular application; possibly in response to receiving the request to scan the particular application, retrieve the unit of program code, the database tables, and the user roles from the computational instance; conduct a static security scan of the unit of program code, the database tables, and the user roles by applying a set of rules that define security vulnerabilities that can be found in hosted applications on the remote network management system, where the rules take into account (i) relationships between the user roles and the unit of program code, and (ii) relationships between the user roles and the database table; and transmit, to the client device, a representation of a web page that contains a categorized list of observed security vulnerabilities of the particular application that were found by the static security scan.

A second example embodiment may include receiving, by a scanner application and from a client device, a request to scan a particular application. A computational instance of a remote network management platform may host the particular application. The particular application may be based on a unit of program code, use one or more database tables, and define one or more user roles with respect to accessing the program code and the database tables. Possibly in response to receiving the request to scan the particular application, the second example embodiment may involve retrieving, by the scanner application, the unit of program code, the database tables, and the user roles from the computational instance. The second example embodiment may involve conducting, by the scanner application, a static security scan of the unit of program code, the database tables, and the user roles by applying a set of rules that define security vulnerabilities that can be found in hosted applications on the remote network management system. The rules may take into account (i) relationships between the user roles and the unit of program code, and (ii) relationships between the user roles and the database table. The second example embodiment may involve transmitting, by the scanner application and to the client device, a representation of a web page that contains a categorized list of observed security vulnerabilities of the particular application that were found by the static security scan.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 depicts a remote network management architecture, in accordance with example embodiments.

FIG. 4 depicts a communication environment involving a remote network management architecture, in accordance with example embodiments.

FIG. 9C depicts a graphical user interface of a scanner application with results of a security scan related to user roles, in accordance with example embodiments.

FIG. 9D depicts a graphical user interface of a scanner application with results of a security scan related to database tables, in accordance with example embodiments.

FIG. 9E depicts a graphical user interface of a scanner application with results of a security scan related to client callable functions, in accordance with example embodiments.

FIG. 9F depicts a graphical user interface of a scanner application with results of a security scan related to sensitive scripts, in accordance with example embodiments.

DETAILED DESCRIPTION

Figure 1:
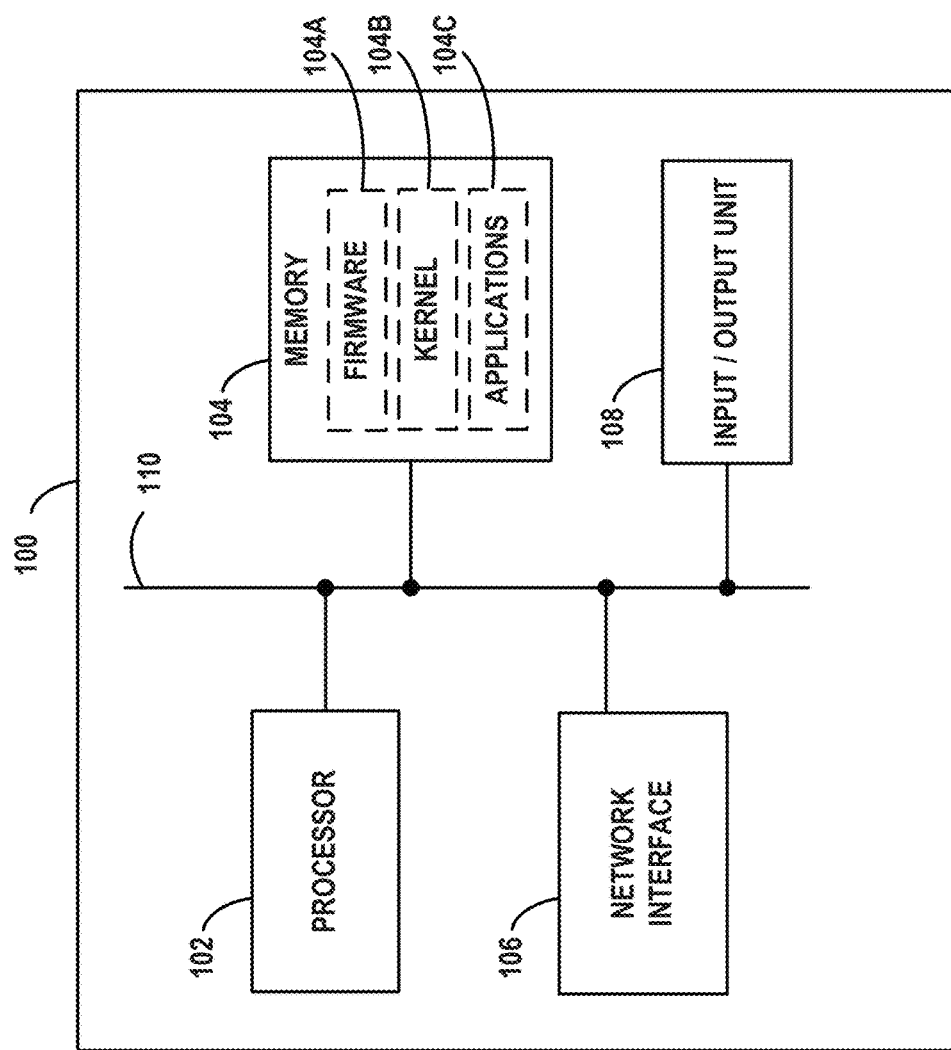
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
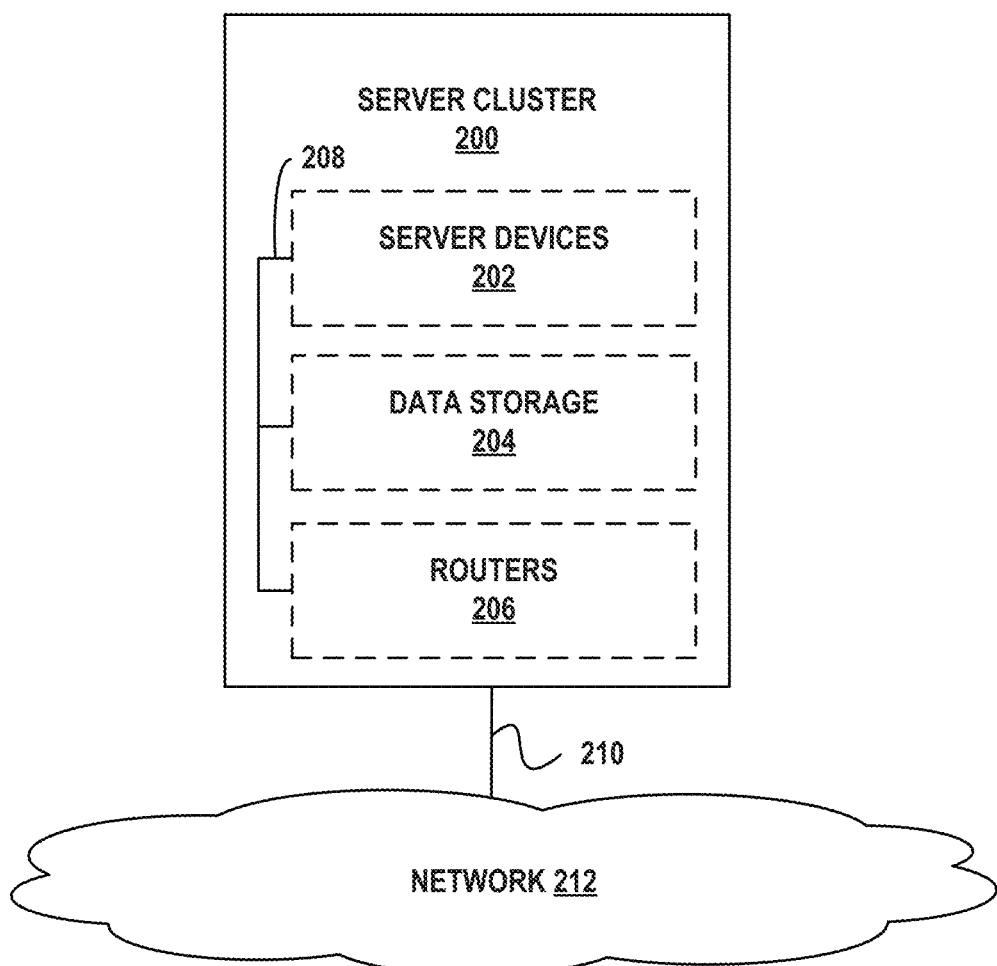
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services. A customer instance may also be referred to as a hosted instance, a remote instance, a computational instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by customer instance 322, or relationships between discovered devices, applications, and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
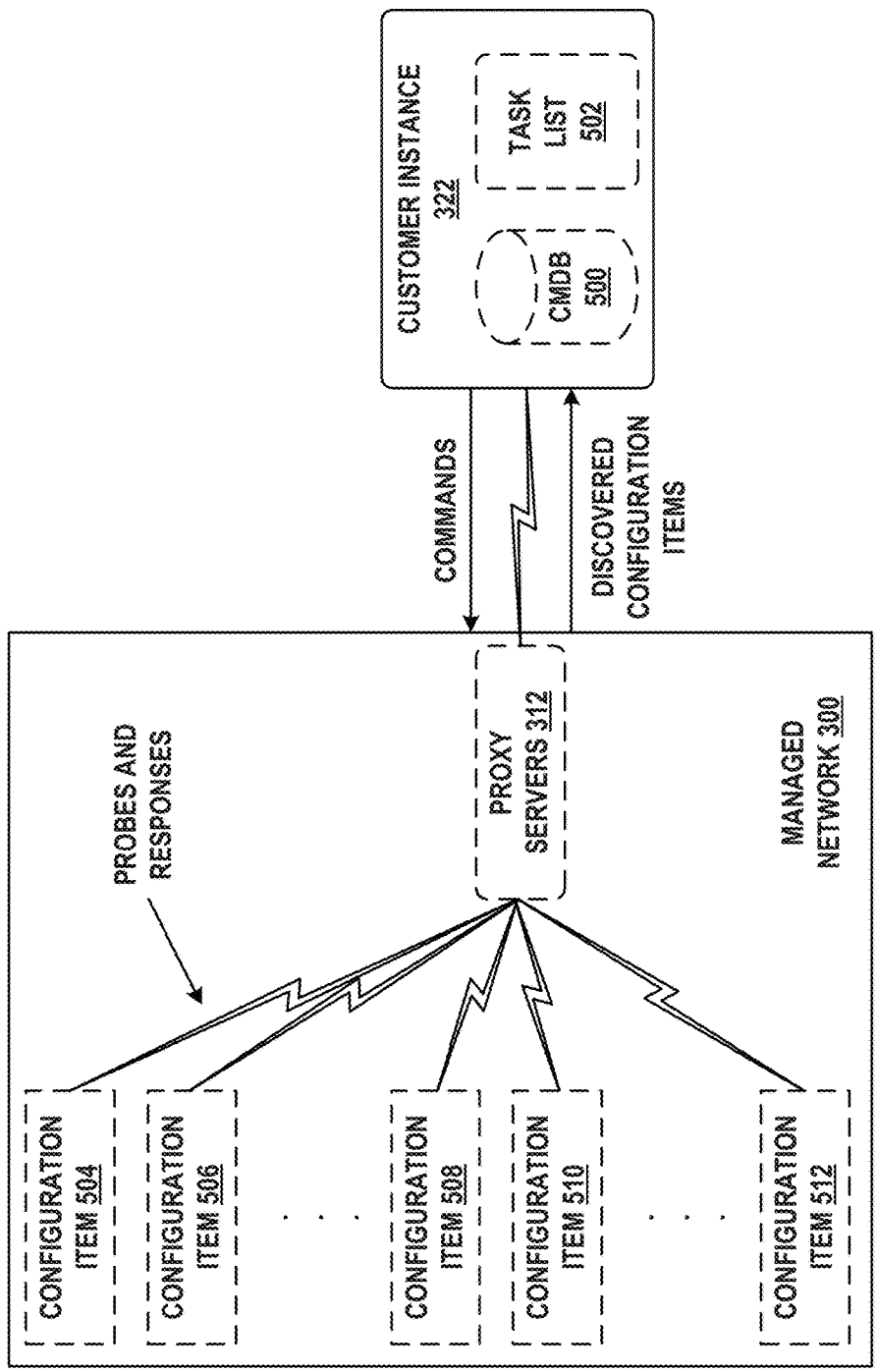
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
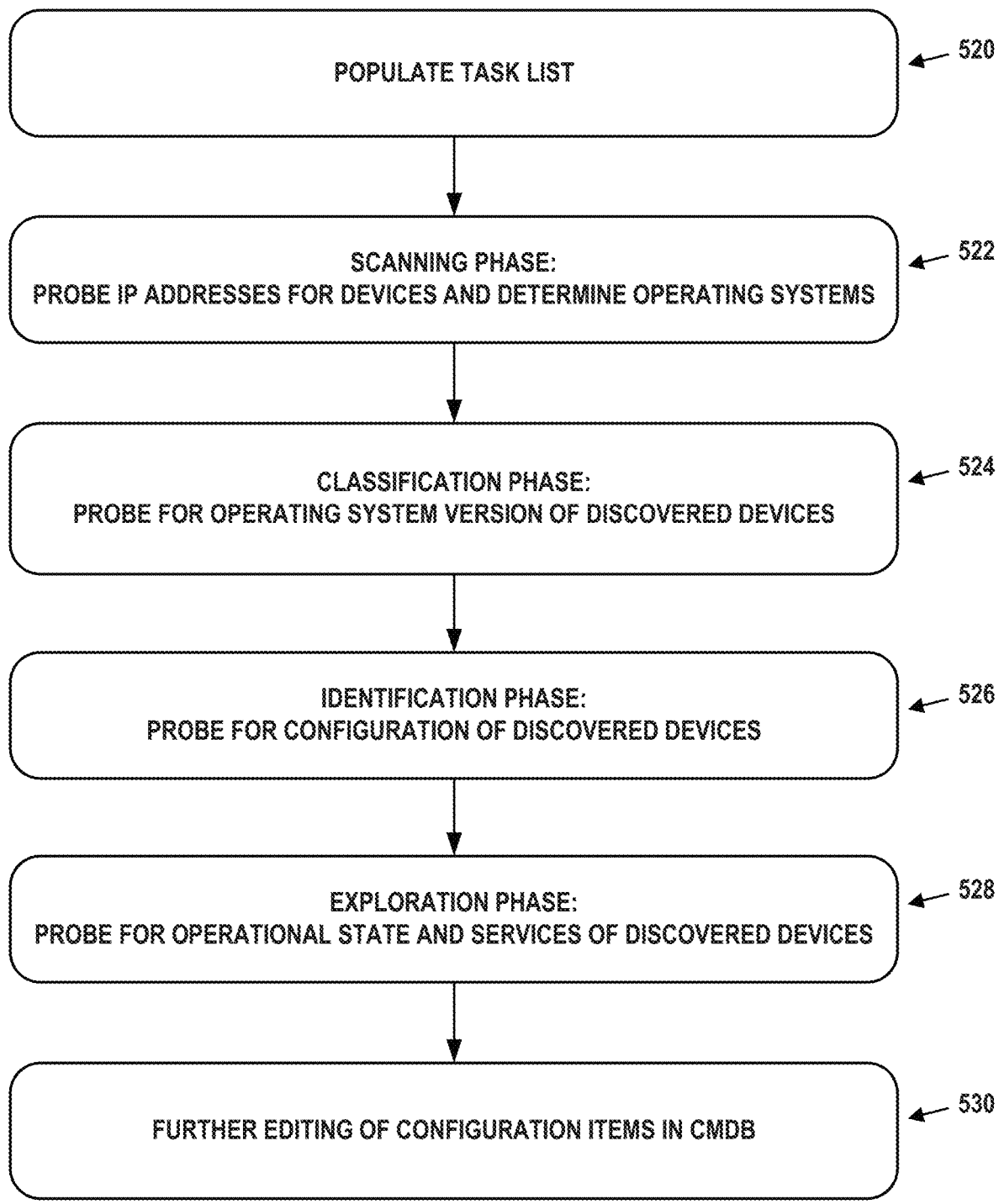
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Application Architecture and Vulnerabilities Thereof

As various entities make use of remote network management platform 320, these entities may develop and use their own custom software applications on top of middleware provided within a customer instance. As noted above, remote network management platform 320 may include various application programming interfaces (APIs) and libraries so that these custom applications can be rapidly developed. For instance, the middleware may include GUI libraries so that custom applications can make use of predefined GUI functionality (e.g., widgets, menus, text boxes, etc.).

Custom applications may be developed in various types of programming languages, both compiled and interpreted. For example, JavaScript, an interpreted language, may be used. Alternatively, a proprietary scripting language that can be converted to JavaScript may be used. Other possibilities exist.

These custom applications may have various purposes or goals. Some may define workflows for HR, supply chain, IT, or finance operations within an enterprise. Thus, it would not be uncommon for custom applications to have access to sensitive information, such as social security numbers, personal identification numbers, credit card numbers, bank account data, and so on. Given the likely presence of such sensitive information, it is desirable for custom applications to be written in such a way that sensitive information is only available to users with proper authorization. For example, a manager of an enterprise's HR division should be able to access any sensitive employee data by way of a custom HR application, but rank-and-file employees should only be able to access their own employee data when they use the application.

Furthermore, the multi-instance architecture of remote network management platform 320 facilitates the deployment of custom applications to multiple enterprises. For example, remote network management platform 320 may support an "application store" where software developers can house custom applications that they have developed. Applications in such a store may be accessible or installable on any customer instance. In some cases, the enterprise associated with the customer instance may be required to pay a one-time or monthly fee for use of such applications, in other cases, the applications may be free.

Figure 6:
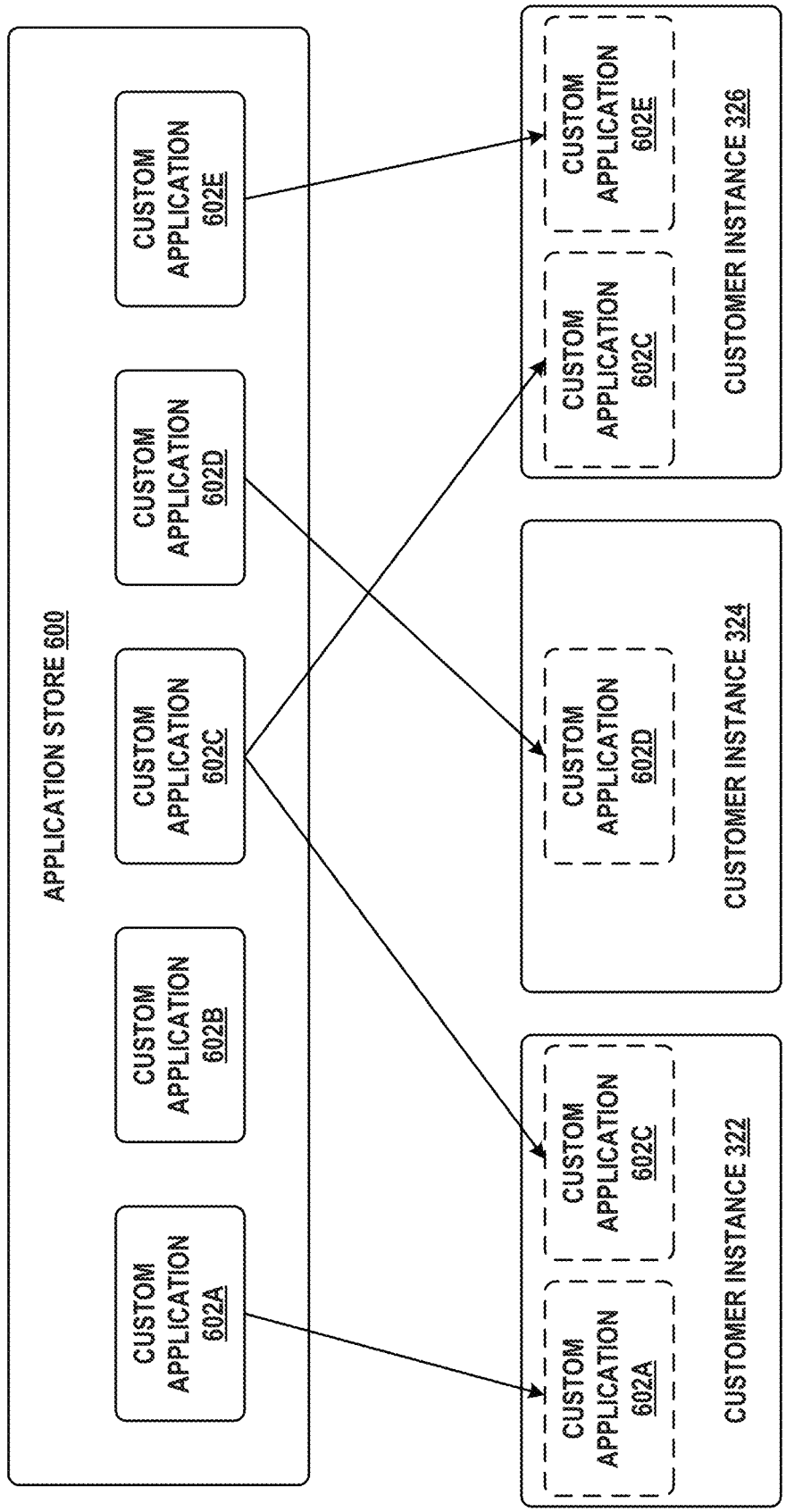
FIG. 6 depicts an application store of a remote network management platform distributing custom applications, in accordance with example embodiments.

To that point, FIG. 6 depicts an application store 600 hosting several custom applications 602A, 602B, 602C, 602D, and 602E. Customer instances 322, 324, and 326 may be able to access, download, and/or locally install at least some of custom applications 602A, 602B, 602C, 602D, and 602E. Application store 600 and customer instances 322, 324, and 326 are assumed to be within remote network management platform 320. As shown in FIG. 6, customer instance 322 has installed copies of custom applications 602A and 602C, customer instance 324 has installed a copy of custom application 602D, and customer instance 326 has installed copies of custom applications 602C and 602E. Custom application 602B is not installed on any customer instances.

The possible widespread deployment of custom applications across multiple customer instances of remote network management platform 320 further illustrates the benefits of performing scans for security vulnerability on these applications. In a particularly severe scenario, a custom application with unintentional defects (i.e., software bugs) that becomes popular by way of application store 600 could be installed in thousands of customer instances, thus exposing a similar number of enterprises to security concerns. Also, it may even be possible for individuals with bad intent (i.e., hackers) to attempt to distribute malware by way of application store 600. Therefore, the ability to scan these applications for such defects, in a semi-automated or fully-automated fashion, is valuable.

In some embodiments, a developer of a custom application may submit this application for inclusion in application store 600. Prior to being approved and placed in application store 600, remote network management platform 320 may perform a scan of the custom application. For instance, the developer may provide an identifier of a customer instance (e.g., the developer's own instance used for testing) on which the application is installed, as well as an identifier of the custom application. With this information, remote network management platform 320 and/or an administrator thereof may initiate the scan.

The source code and/or other human-readable program code of a custom application may be stored in a customer instance during development and possibly even after deployment. The availability of this code facilitates the static security scanner application described herein. Particularly, the scanner application may obtain copies of the custom application's source code, database tables that the custom application accesses, and any user roles defined by the custom application. With this information, the scanner application may seek to identify security vulnerabilities within the custom application. There are numerous potential vulnerabilities that the scanner application may be able to identify.

The security scans herein may be referred to as "static," in that they involve analyzing the code, data, and access permissions associated with a custom application without necessarily executing the custom application. This makes the scans faster, more predictable, and capable of finding a variety of security vulnerabilities or potential security vulnerabilities in the custom application. Nonetheless, conducting these static security scans does not preclude executing the custom application or taking actions consistent with application execution to detect other vulnerabilities.

Figure 7:
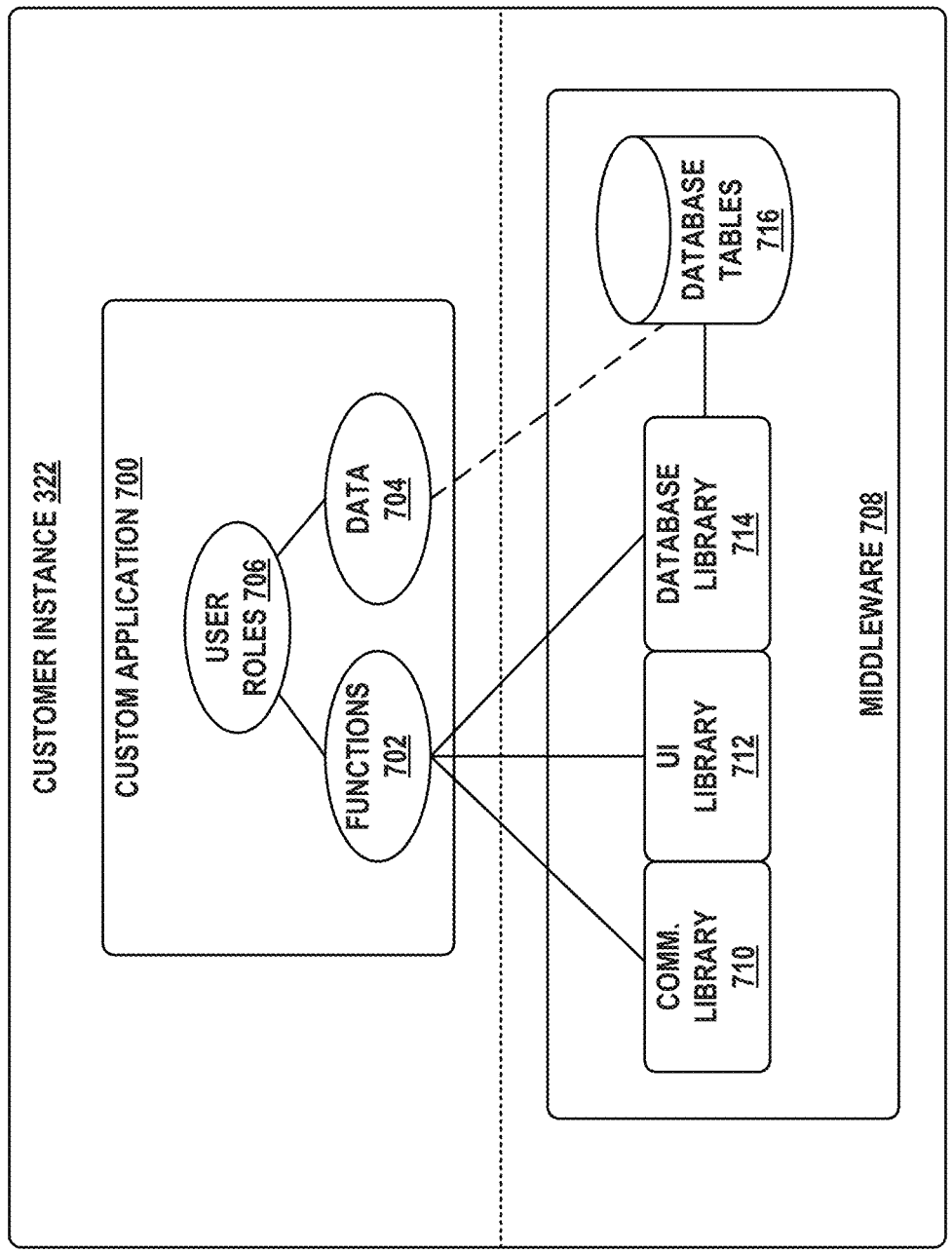
FIG. 7 depicts the software architecture of a custom application hosted within an instance of a remote network management platform, in accordance with example embodiments.

FIG. 7 depicts an example software architecture of a custom application hosted within a customer instance of a remote network management platform. Particularly, custom application 700 includes functions 702, uses data 704, and defines user roles 706. Custom application 700 may include one or more units of program code (or source code) of which functions 702 may be a part. This program code may manipulate data 706 (e.g., create, read, write, delete) to carry out operations. Data 706 may be retrieved from database tables 716, used or modified by custom application 700, then potentially stored once again in database tables 716.

User roles 706 may define one or more types of user and permissions associated therewith. These user roles may control access to features and capabilities in applications. Once access rules have been defined for a user role, all of the users or groups of users assigned to the user role are granted the access. In some cases, user roles may be derived from other user roles, and any access granted to one of these other user roles is granted to any user role derived therefrom.

Access rules for a user role may take the form of an access control list (ACL). An ACL may provide a list of per-user-role permissions associated with an object, such as one of functions 702 or one or database tables 716. For example, an "administrator" role may have create, read, write, and delete permissions for all of database tables 716. On the other hand, a "basic_user" role may have read and write access permissions for one of database tables 716 and only read access permission for another of database tables 716.

In general, the "administrator" role may be useable by a small number of individuals who have unlimited (e.g., superuser) access permissions. Thus, the "administrator" role might be granted to IT professionals who are responsible for maintenance of the custom application. The "basic_user" role, on the other hand, may be assigned to individual users and may have restricted access permissions.

Middleware 708 may include libraries defined by remote network management platform 320 for use by custom applications. The logical and/or architectural difference between customer instance 322 and middleware 708 is demarked by the horizontal dotted line in FIG. 7.

Some of the libraries may include communication library 710 containing functions that facilitate transmission and reception of data over a network, user interface (UI) library 712 containing functions that facilitate displaying graphical or text-based user interfaces and receiving input therefrom, and database library 714 containing functions that facilitate reading from and writing to database tables 716. Thus, data 704 may be read from database tables 716 by way of functions 702 using an API to access database library 714. This indirect access is represented in FIG. 7 by the dashed line between data 704 and database tables 716. Other possibilities exist.

As noted previously, security vulnerabilities may arise with respect to how user roles 706 define access permissions to functions 702 and data 704 for various users. But an automated scan of the program code of custom application 700 may also reveal additional vulnerabilities, such as open redirections and server-side include injections. Each of these vulnerabilities, as well as how they can be detected, is discussed in more detail below.

VI. Example Scanner Application

Figure 8:
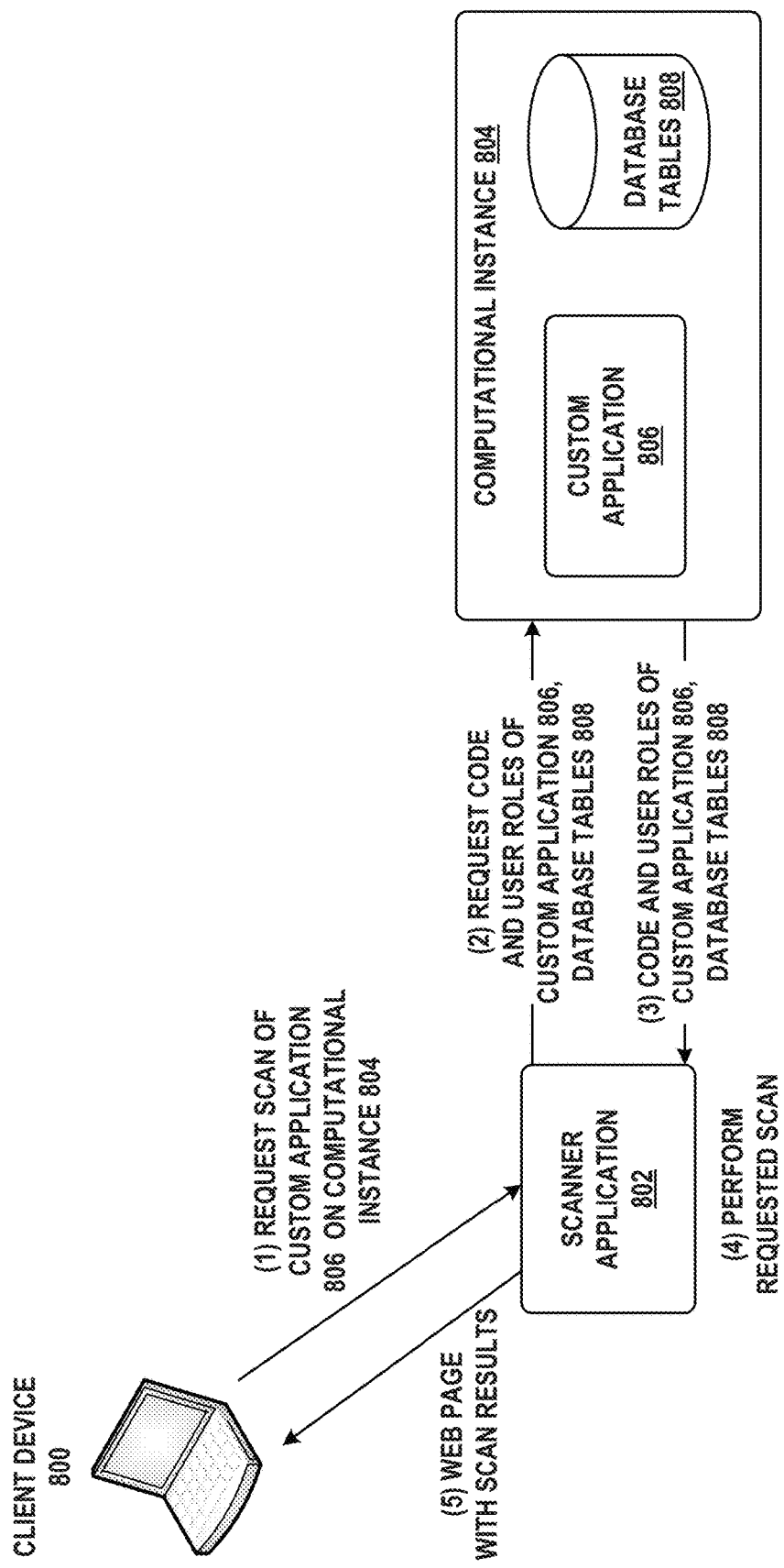
FIG. 8 depicts a message flow for scanning a custom application for security vulnerabilities, in accordance with example embodiments.

FIG. 8 depicts a message flow involving a scanner application 802. The message flow illustrates the high-level operations of the scanner application and its working environment.

Scanner application 802 may be deployed on remote network management platform 320 that includes computational instance 804 (here, the terminology "computational instance" is used to signify that this instance may or may not be assigned to a specific enterprise customer of remote network management platform 320). Computational instance 804 includes custom application 806 and database tables 808. As noted earlier, but not represented in FIG. 8, custom application 806 may include program code that contains functions, uses data in accordance with database tables 808, and defines user roles.

At step (1) of FIG. 8, client device 800 transmits a request, to scanner application 802, for a scan of custom application 806 on computational instance 804. In the request, custom application 806 and computational instance 804 may be specified by respective unique identifiers. Client device 800 may be operated by a user and may therefore provide a graphical user interface with controls that facilitate the sending of the request. Alternatively, client device 800 could remotely trigger, in an automated fashion, the sending of the request. Without loss of generality, the following discussion assumes that client device 800 is user-controlled.

At step (2), possibly in response to receiving the request, scanner application 802 may transmit, to computational instance 804, a request for the program code and user roles associated with custom application 806, as well as for database tables 808. This request may also include the respective unique identifiers for computational instance 804 and custom application 806.

At step (3), reception of the request at computational instance 804 may trigger computational instance 804 to transmit, to scanner application 802, the program code and user roles associated with custom application 806, as well as database tables 808.

At step (4), scanner application 802 may perform the requested scan. This scan may involve a number of phases and/or steps, and may be based on a particular set of rules that define security vulnerabilities that can be found in hosted applications on the remote network management system.

At step (5), scanner application 802 may transmit, to client device 800, a representation of a web page with the results of the scan. As a consequence of receiving this representation, client device 800 may display the web page on its graphical user interface.

Figure 9A:
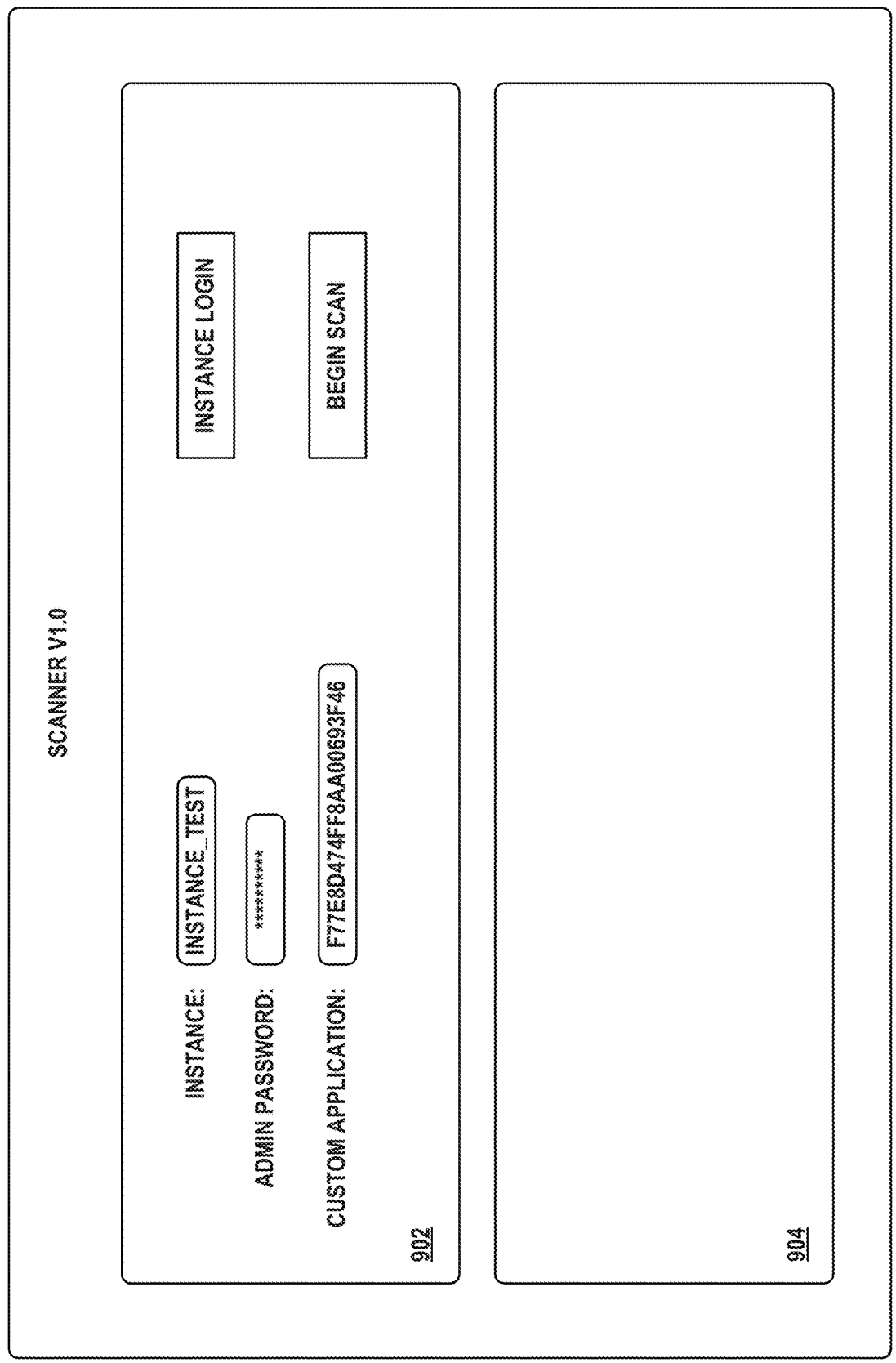
FIG. 9A depicts a graphical user interface of a scanner application, in accordance with example embodiments.

With regard to the web page, FIG. 9A depicts an example web-based graphical user interface 900 that may be displayed to the user prior to step (1). Graphical user interface 900 may include an input pane 902 and an output pane 904. As shown, input pane 902 may allow a user to enter the unique identifier of computational instance 804 ("INSTANCE_TEST"), an administrative password for the computational instance 804 (which, as shown, may be obscured for purpose of security), and the unique identifier of custom application 806 ("F77E8D474FF8AA00693F46"). Using the "INSTANCE LOGIN" button, the user may then trigger the sending of a request in accordance with step (1). At this point, output pane 904 may be empty, since no output has yet been generated.

As noted above, the scan may be triggered at step (4). For instance, the user may activate the "BEGIN SCAN" button to do so. In some embodiments, the user may be shown one or more interstitial panes or web pages while the scan takes place.

Figure 9B:
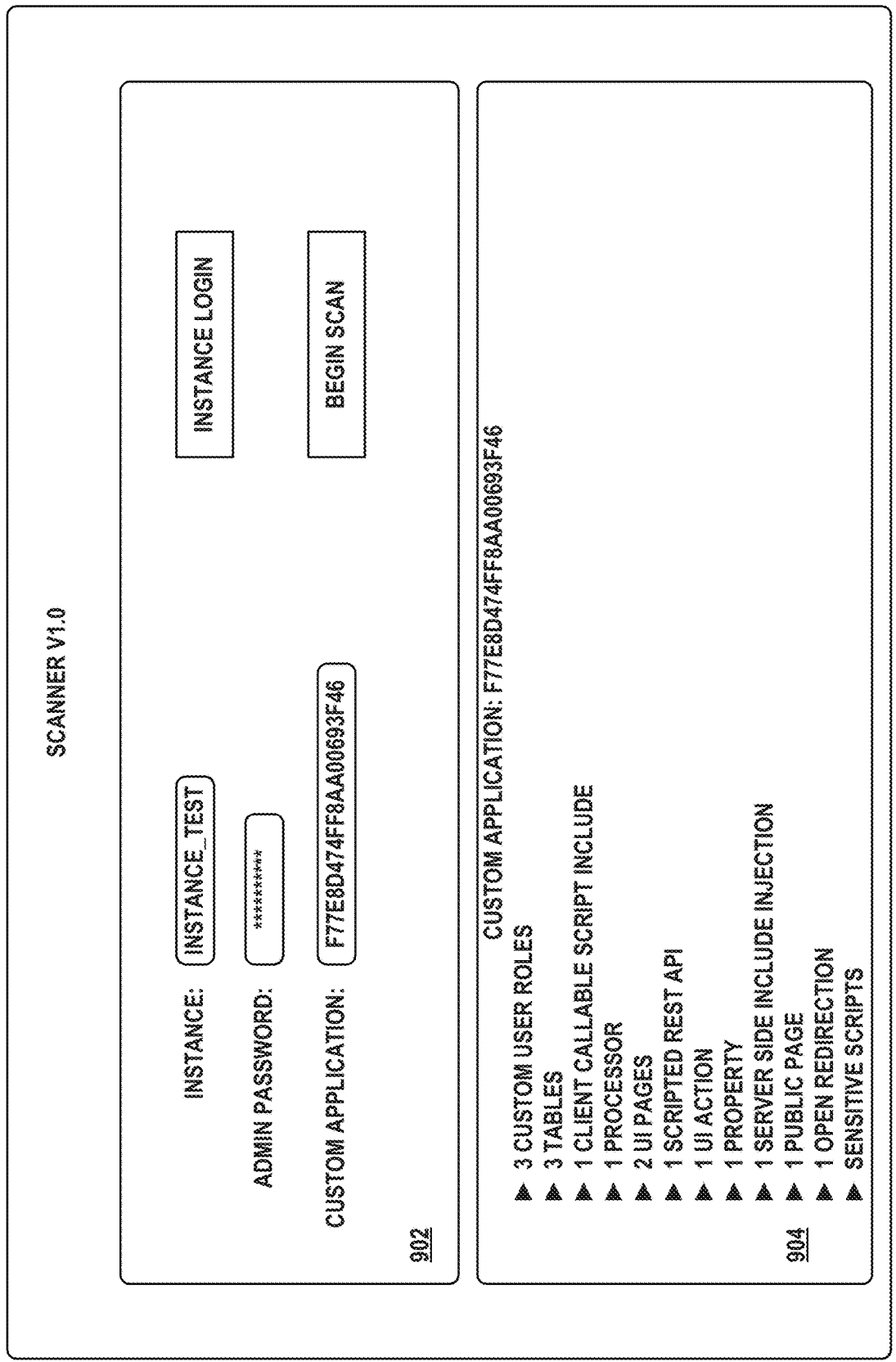
FIG. 9B depicts a graphical user interface of a scanner application with high-level results of a security scan, in accordance with example embodiments.

Also as noted above, at step (5) scanner application 802 may transmit a representation of the web page of FIG. 9B to client device 802 for display. While input pane 902 in FIG. 9B is the same as it was in FIG. 9A, output pane 904 contains a summary of the results of the scan.

For example, in FIG. 9B, output pane 904 includes an interactive list of observed security vulnerabilities associated with custom application 806, as well as other relevant information that may be helpful to a user attempting to evaluate the severity of these vulnerabilities. Each entry in the list may be expanded by clicking on, or otherwise activating the entry. For instance, if the user clicks on the entry "3 Custom User Roles", additional information for this entry may be displayed. In general, any entry with a right-pointing arrow (such as any of the entries in output pane 904) may be expanded in this fashion. Once expanded, an entry may be contracted back to a single line if the user clicks on or otherwise activates the entry again.

The following sections provide more detailed descriptions of some of the vulnerabilities displayed in output pane 904, as well as the rules that scanner application 802 could use to identify these vulnerabilities. These descriptions are not comprehensive, and are merely for purpose of example. Therefore, more or fewer vulnerabilities may be identified, and such identification may take place in the fashion discussed herein or in other ways.

A. Custom User Roles

FIG. 9C depicts output pane 904 of user interface 900 with the "3 Custom User Roles" entry expanded. Particularly, the three user roles defined for scanner application 802 are "administrator", "basic_user", and "integration". Each of these user roles may define different sets of access permissions with respect to custom application 806. Further, some user roles may derive these access permissions from other user roles.

As shown in FIG. 9C, the "administrator" user role derives its access permissions from the "basic_user" user role, while the "basic_user" user role does not derive its access permissions from any other user role. The "integration" user role, on the other hand, derives its access permissions from both the "administrator" and "basic_user" user roles. These user role relationships may be displayed in a table as shown, or in some other fashion.

Notably, these relationships may indicate the presence (or lack thereof) of possible vulnerabilities. For instance, the "administrator" role deriving access permissions from the "basic_user" user role might not be considered a vulnerability, as administrators are expected to have virtually unlimited access permissions. On the other hand, the "integration" user role deriving its access permissions from the "administrator" user role is a potential vulnerability, because it effectively gives a second account the administrator's access permissions. While only custom roles are shown in FIG. 9C, some of these custom roles may derive their access permissions from additional default system roles.

Also, an analysis of the names of the user roles may indicate that an "integration" user role (usually involved in application development and testing) is unlikely to need administrative privileges. Therefore, scanner application 802 may have rules that identify certain types of relationships between user roles, where these relationships could be problematic. For instance, any user role that derives its permissions from an administrative user role (i.e., the administrative user role is shown in "derived from" column) could be flagged as a vulnerability.

To that point, scanner application 802 may display the information as shown in FIG. 9C, or may highlight or otherwise emphasize an observed vulnerability. For instance, the third row of the user roles table may be displayed in a different font or color from the other rows.

Furthermore, since user interface 900 may take the form of a web page, each of the user roles displayed in FIG. 9C may include an embedded hyperlink to another web page with that user role's respective definition on computational instance 804. If a user clicks on or otherwise activates this hyperlink, his or her web browser may open the web page with the user role's respective definition.

B. Tables

FIG. 9D depicts output pane 904 of user interface 900 with the "3 Tables" entry expanded. This expanded entry displays access permissions in the form of ACLs for three of database tables 808 that are used by custom application 806. These tables are named "app.config", "app.transactions", and "app.alert".

For the "app.config" table, the "basic_user" user role has been granted create, read, write, and delete access permissions. As discussed above, the "administrator" has all access permissions of the "basic_user" user role. Thus, both the "basic_user" and "administrator" user roles can create, read, write, and delete entries from the "app.config" table.

For the "app.transactions" table, the "basic_user" user role has been granted create and read access permissions, while write and delete access permissions are only available to the "administrator" user role.

For the "app.alert" table, the "basic_user" user role and the null user role have been granted read access permissions.

Notably, these access permissions may indicate the presence (or lack thereof) of possible vulnerabilities. For instance, the "basic_user" user role having write access permissions to a database table, where the database table controls an application's configuration, may be a vulnerability in general. A low-privileged user probably should not be able to change an application's configuration. This vulnerability may arise when a software developer grants a user role write access to a table during development or testing, but fails to delete this access permission.

Additionally, the "basic_user" user role having read access to a database table may also be a vulnerability. Particularly, if that access is not limited to entries in the database table associated with a particular user, this user may be able to view other users' data. The "<LINK>" parenthetical after the user role for having read access permission to the app.transactions table may be a hyperlink that, when activated, retrieves a web page in which the user of scanner application 802 can view the ACL for this table in more detail. This more detailed view may display whether the user roles are limited to reading certain entries in the app.transactions table. If an access permission for a particular table does not have a more specific ACL, the "<LINK>" parenthetical might not be shown. This vulnerability may arise when a software developer defines a general ACL for a table, but fails to define a more specific user-level ACL for reading sensitive data in the table.

Moreover, use of the null user role may be a vulnerability, as it grants all user roles access to a table. In FIG. 9D, for example, the "app.alert" table grants all users read access through use of a null user role. This vulnerability may arise when a software developer grants a null user role access to a table during development or testing, but forgets to delete this access permission.

Scanner application 802 may display the information as shown in FIG. 9D, or may highlight or otherwise emphasize an observed vulnerability. For instance, the entries for "app.config" write and delete access permissions, "app.transactions" read access permissions, and "app.alert" read access permissions for the null user may be displayed in a different font or color from the other rows.

Furthermore, since user interface 900 may take the form of a web page, each of the database tables and access permissions displayed in FIG. 9D may include an embedded hyperlink to another web page with that table's or permission's respective definition on computational instance 804. If a user clicks on or otherwise activates this hyperlink, their web browser may open the web page to display the respective definition. As an example, if a user of scanner application 802 is uncertain whether a particular user role should have a particular access permission to a table, the user can use the hyperlink to view the entries of the table in order to make this determination.

If any of these entries contain sensitive information (e.g., passwords, social security numbers, credit card numbers, bank account numbers, etc.), the user may determine that access to this information should be limited to particular user roles. Alternatively or additionally, scanner application 802 may look for entries in database tables 808 with sizes and/or formats that could hold sensitive information (e.g., a nine-digit entry that could hold social security numbers, a 16-digit entry that could hold credit card numbers) and flag non-administrator user roles with access to database tables 808 as vulnerabilities.

C. Client Callable Script Includes

FIG. 9E depicts output pane 904 of user interface 900 with the "1 Client Callable Script Include" entry expanded. This expanded entry displays functions that are defined by custom application 806 and parameters used by these functions. For example, the function process( ) of the class transferMoney uses three parameters: from_acct, to_acct, and amount. Calling this function will transmit "amount" from the account indicated by "from_acct" to the account indicated by "to_acct". The "basic_user" role can call this function, which means that this user may be able to transfer money between any two accounts. Such a capability is an example of a vulnerability. Further, since the type of the function is AJAX (Asynchronous JavaScript And XML), this function may be callable by executing JavaScript via a web browser console, sending a customized hypertext transfer protocol (HTTP) request to the URL, or in some other fashion. Regardless, such a capability is another potential vulnerability.

Thus, scanner application 802 may display the information as shown in FIG. 9E, or may highlight or otherwise emphasize an observed vulnerability. For instance, the entries for the process( ) function may be displayed in a different font or color from other parts of the page.

Scanner application 802 may have rules to detect these vulnerabilities. For instance, scanner application 802 may look for functions that are callable by a non-administrative user.

D. Processor

A processor is a request handler that contains server-side code. This code may be executed when a processor is accessed by way of a URL. Such a processor can contain a sensitive script that can cause security issues (e.g., the script may access sensitive information). A processor can be protected by associating it with appropriate ACLs. But if there are no ACLs associated with the processor, it can be accessed by all logged-in users.

Scanner application 802 may identify and report potential vulnerabilities with processors. In doing so, scanner application 802 may display details of any ACLs that are configured. Scanner application 802 may also display user-controllable parameters of processors, similar to those of client callable script includes.

E. UI Pages

User interface (UI) pages may be custom web pages associated with an application or service. They can also contain server side code that is executed when they are accessed by way of a URL. Such a UI page can contain a sensitive script that can cause security issues (e.g., the script may access sensitive information). A UI page can be protected by associating it with appropriate ACLs. But if there are no ACLs associated with the UI page, it can be accessed by all logged-in users.

Scanner application 802 may identify and report potential vulnerabilities with UI pages. In doing so, scanner application 802 may display details of any ACLs that are configured. Scanner application 802 may also display user-controllable parameters of UI pages, similar to those of client callable script includes.

F. Scripted REST APIs

Scripted representational state transfer (REST) APIs are resource-based custom web service APIs that use JSON for representation of information. They may also contain server-side code that is executed when a REST API is accessed by way of a URL. A scripted REST API can contain multiple end points and methods. These methods may have individual security rules associated with ACLs, or a default ACL rule. Any such method can contain a sensitive script that can cause security issues (e.g., the script may access sensitive information).

Scanner application 802 may identify and report potential vulnerabilities with a scripted REST API and its methods. In doing so, scanner application 802 may display details of any ACLs that are configured. Scanner application 802 may also display user-controllable parameters of scripted REST APIs, similar to those of client callable script includes.

G. UI Actions

UI actions are buttons (or other types of widgets or icons) that, when clicked on or otherwise activated, can execute a script on the web server device providing the UI action. Such a script can also utilize user-controllable data in parameters. The script execution can be triggered by any user if it is not protected by an ACL. Scanner application 802 may display a security configuration of each UI action, such as any conditions or roles required to execute the script.

H. Server-Side Include Injections

Server-side includes (SSIs) may be directives in web applications used to provide a web page with dynamic content. SSIs can be used to execute actions before a web page is loaded or while the web page is being viewed by the user. In order to do so, the web server may read and process the SSI before supplying the web page to the user.

An SSI injection forces a web application to execute arbitrary program code. Particularly, an attacker could provide input that, if inserted by the web application (or maybe directly by the server) into a dynamically generated web page, would be parsed as one or more SSI commands.

For instance, suppose that a proprietary scripting language that can be converted to JavaScript supports the command <evaluate>var user=${sysparam_user}</evaluate>. The <evaluate> method may execute any script embedded therein. Similarly, the JavaScript eval( ) method may execute any script embedded therein. If the code being evaluated is derived from user input or from data received over a network, an attacker can potentially cause arbitrary code to be executed.

Thus, scanner application 802 may check custom application 806 for any program code that allows an SSI injection. In some cases, scanner application 802 may identify any potential opening for an SSI injection as a vulnerability, and may highlight or otherwise emphasize these vulnerabilities in output pane 904. For instance, any string beginning with "${sysparam" inside of} an <evaluate> tag may be considered a potential SSI injection.

I. Open Redirections

Users accessing a web page with an open redirection can be automatically redirected to an untrusted and/or malicious target web page instead of the intended web page. This target web page may mimic the intended web page, and thus may be part of a phishing attack that seeks to have users provide personal or private information by way of the target web page.

An example of redirection is as follows. A user makes a request to http://example.com/profile. The example.com web site determines that the user has not yet logged in, and is therefore unauthenticated. Accordingly, the example.com web site redirects the user to the login page, and stores the original URL by adding a parameter to the URL of the login page http://example.com/login?toURL=http://example.com/myprofile. After the user logs in, he or she will be redirected to the stored http://example.com/myprofile. In the ideal case, the web application at http://example.com/login will check to ensure that all redirections in the URL are valid—for instance, the web application might only allow redirections to example.com.

In an open redirection scenario, however, the web application allows redirections with limited or no restrictions. For instance, a user may be provided (e.g., by way of an email message) with the URL http://example.com/login?toURL=http://badexample.com/myprofile. The user may believe that they are visiting example.com when they access the web site at this URL, because example.com is the first domain name in the URL.

If the web application at http://example.com/login allows open redirections, the user will be automatically redirected to http://badexample.com/myprofile. This latter URL may refer to a web site that mimics the appearance of example.com and may prompt the user to enter a userid and password for example.com. In this manner, a phishing attack can take place.

Another type of open redirection can occur in JavaScript or other languages that allow redirection of a user to another site. For instance, the JavaScript document.location( ) or document.location.href( ) functions may allow such redirection. As an example, the JavaScript code <script>document.location.href="http://badexample.com";
</script> redirects the user to http://badexample.com.

Thus, scanner application 802 may check custom application 806 for any program code that allows such an open redirection. In some cases, scanner application 802 may identify any redirection as a vulnerability, and may highlight or otherwise emphasize these vulnerabilities in output pane 904. For instance, scanner application 802 may check for JavaScript code that passes user-controllable data to location objects, such as window.location. An example of this would be the code <script>document.location="${sysparm_next_url}";</script>, as "${sysparm_next_url}" is user-controllable.

J. Public Pages

Most web applications require that a user log in to the application before being able to substantively use the application. For instance, a user would typically log in to a financial application before being able to use this application to transfer money between accounts. However, due to coding errors or misconfigurations, some such web applications may have one or more public pages—web pages that can be accessed without first logging in. Each of these public pages may be identified as a security vulnerability.

Thus, scanner application 802 may check custom application 806 for all web pages therein. Scanner application 802 may attempt to access each of these web pages without logging in to custom application 806. If scanner application can do so, these pages may be classified as security vulnerabilities, and scanner application 802 may highlight or otherwise emphasize these vulnerabilities in output pane 904.

K. Sensitive Scripts

FIG. 9F depicts output pane 904 of user interface 900 with the "Sensitive Scripts" entry expanded. This expanded entry displays keywords that are used in scripts of custom application 806. These keywords typically refer to sensitive information that may be, for example, readable from the program code of custom application 806. Examples of such sensitive keywords include "password", "pw", "pwd", "username", "token", "API", "API_key", and "APIKEY". Other possibilities exist.

Output pane 904 may display a list of sensitive keywords in one column, hyperlinks to locations of where these keywords were found in another column, and how the keywords are used in yet another column. For example, the hyperlink in the "Location" column for the "password" keyword may direct the user to a web page in the computational instance containing custom application 806. This web page may display the program code where the keyword was found. The line or lines of program code that contain the keyword may be displayed in the "Usage" column.

Scanner application 802 may display the information as shown in FIG. 9F, or may highlight or otherwise emphasize an observed vulnerability. For instance, the entries for the "password" and "username" keywords may be displayed in a different font or color from other parts of the page.

Scanner application 802 may have rules to detect these vulnerabilities. For instance, scanner application 802 may parse source code and/or scripts of custom application 806 in an attempt to find these keywords.

VII. Example Operations

Figure 10:
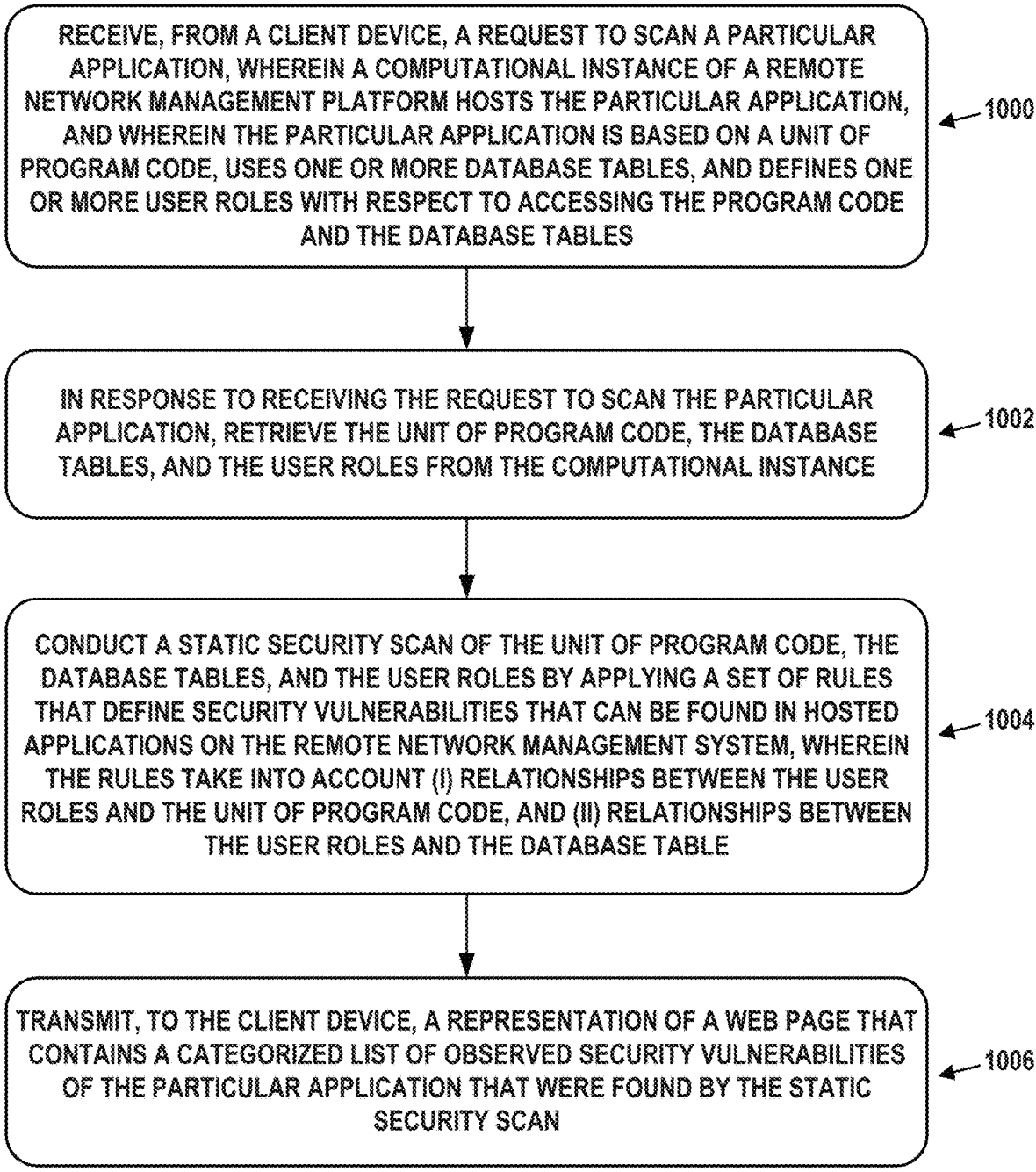
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, by a scanner application and from a client device, a request to scan a particular application. A computational instance of a remote network management platform may host the particular application. The particular application may be based on a unit of program code, use one or more database tables, and define one or more user roles with respect to accessing the program code and the database tables. In some embodiments, the remote network management platform may also host the scanner application.

Block 1002 may involve, possibly in response to receiving the request to scan the particular application, the scanner application retrieving the unit of program code, the database tables, and the user roles from the computational instance.

Block 1004 may involve conducting, by the scanner application, a static security scan of the unit of program code, the database tables, and the user roles by applying a set of rules that define security vulnerabilities that can be found in hosted applications on the remote network management system. The rules may take into account (i) relationships between the user roles and the unit of program code, and (ii) relationships between the user roles and the database table.

Block 1006 may involve transmitting, by the scanner application and to the client device, a representation of a web page that contains a categorized list of observed security vulnerabilities of the particular application that were found by the static security scan.

In some embodiments, the user roles include at least two user roles with different sets of access permissions. The rules may also take into account relationships between the user roles. Conducting the static security scan may involve identifying, as a security vulnerability, a relationship between the user roles in which a first user role of the at least two user roles derives its access permissions from a second user role of the at least two user roles.

In some embodiments, the user roles include administrative user roles, non-administrative user roles, and null user roles. Conducting the static security may involve identifying, as a security vulnerability, that at least one of the database tables has an access control list that either: grants write or delete permission to a non-administrative user role, grants unlimited read access to the non-administrative user role, or grants any permission to a null user role.

In some embodiments, the user roles include administrative user roles and non-administrative user roles. The unit of program code may define a function. Conducting the static security scan may involve identifying, as a security vulnerability, that a non-administrative user role can call the function.

In some embodiments, conducting the static security scan involves identifying, as a security vulnerability, that the unit of program code contains a server-side include that allows the execution of commands.

In some embodiments, conducting the static security scan involves identifying, as a security vulnerability, that the unit of program code contains a command that allows a user of the application to be redirected to a different web page.

In some embodiments, conducting the static security scan involves identifying, as a security vulnerability, that the unit of program code contains a publicly accessible web page.

In some embodiments, the scanner application defines one or more sensitive keywords. Conducting the static security scan may involve identifying, as a security vulnerability, that the unit of program code contains at least one of the sensitive keywords.

In some embodiments, the static security scan takes into account possible security vulnerabilities related to use, by the unit of program code, of one or more APIs specific to the remote network management system.

In some embodiments, the static security scan takes into account possible security vulnerabilities related to use, by the unit of program code, of one or more program coding conventions for developing custom applications for the remote network management system.

In some embodiments, an entry in the categorized list includes a hyperlink. Activating the hyperlink may cause the scanner application to display details regarding observed security vulnerabilities related to the entry.

In some embodiments, an entry in the categorized list includes a hyperlink. Activating the hyperlink may cause retrieval of a second web page from the computational instance. The second web page may contain an observed security vulnerability corresponding to the entry.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a processor; and
   a memory, accessible by the processor, the memory storing instructions, that when executed by the processor, cause the processor to perform operations comprising:
   conducting a security scan of program code defining a software application, wherein the program code defines at least two user roles having different sets of access permissions to the program code and to one or more database tables, wherein conducting the security scan comprises applying one or more rules to identify a relationship between the at least two user roles as a security vulnerability of the software application; and
   transmitting, to a computing device, a graphical user interface comprising an indication of the relationship between the at least two user roles as the security vulnerability and an additional indication corresponding to the at least two user roles, wherein a user input associated with the additional indication is configured to cause display of one or more role definitions associated with the at least two user roles.

2. The system of claim 1, wherein the additional indication comprises respective links that are configured to display the one or more role definitions associated with the at least two user roles.

3. The system of claim 1, wherein the one or more rules define a second relationship between the at least two user roles and the program code, a third relationship between the at least two user roles and the one or more database tables, or the relationship between the at least two user roles, or a combination thereof, as a second security vulnerability.

4. The system of claim 1, wherein the security vulnerability comprises a first user role of the at least two user roles deriving access permissions from the second user role of the at least two user roles.

5. The system of claim 1, wherein the operations comprise receiving a request to scan the software application for one or more possible security vulnerabilities.

6. The system of claim 1, wherein the graphical user interface comprises a categorized list of a plurality of security vulnerabilities associated with the software application, wherein the categorized list of the plurality of security vulnerabilities includes the indication of the relationship between the at least two user roles.

7. The system of claim 6, wherein the categorized list of the plurality of security vulnerabilities is configured to be interactive, and wherein selection of a particular security vulnerability in the categorized list is configured to display the program code, a particular portion of the one or more database tables, or a particular role definition of the at least two user roles, or a combination thereof, associated with the particular security vulnerability.

8. A method, comprising:
receiving, via one or more processors, a request to scan program code defining a software application for one or more security vulnerabilities;
conducting, via the one or more processors, a security scan of the program code, wherein the program code defines at least two user roles having different sets of access permissions to the program code and to one or more database tables, wherein conducting the security scan comprises applying one or more rules to identify the one or more security vulnerabilities associated with the software application, and wherein the one or more security vulnerabilities comprises a relationship between the at least two user roles; and
transmitting, via the one or more processors to a computing device, a graphical user interface comprising a categorized list of the one or more security vulnerabilities associated with the software application, wherein the one or more security vulnerabilities comprises an indication corresponding to the at least two user roles, and wherein a user input associated with the indication is configured to cause display of one or more role definitions associated with the at least two user roles.

9. The method of claim 8, wherein the categorized list of the one or more security vulnerabilities is interactive such that selection of a particular security vulnerability in the categorized list is configured to display the program code, a particular portion of the one or more database tables, or a particular role definition of the at least two user roles, or a combination thereof, associated with the particular security vulnerability.

10. The method of claim 8, wherein the one or more security vulnerabilities associated with the software application comprise a particular user role of the at least two user roles having improperly been granted read permission, write permission, create permission, or delete permission, or a combination thereof, for the one or more database tables.

11. The method of claim 8, wherein the one or more security vulnerabilities associated with the software application comprise one or more sensitive keywords in the program code.

12. The method of claim 8, wherein the one or more security vulnerabilities associated with the software application comprise a server-side include in the program code.

13. The method of claim 8, wherein the one or more security vulnerabilities associated with the software application comprise an open redirection associated with the software application.

14. The method of claim 8, wherein the one or more security vulnerabilities associated with the software application comprise a publicly accessible web page in the program code.

15. A non-transitory, computer-readable medium, comprising instructions that when executed by one or more processors, cause the one or more processors to perform operations comprising:
conducting a security scan of program code defining a software application, wherein the program code defines at least two user roles having different sets of access permissions to the program code and to one or more database tables, wherein conducting the security scan comprises applying one or more rules to identify one or more security vulnerabilities associated with the software application, wherein the one or more security vulnerabilities comprise a relationship between the at least two user roles; and
transmitting, to a computing device, a graphical user interface comprising an interactive categorized list of the one or more security vulnerabilities associated with the software application, wherein the one or more security vulnerabilities comprises an indication corresponding to the at least two user roles, wherein a user input associated with the indication is configured to cause display of one or more role definitions of the at least two user roles.

16. The non-transitory, computer-readable medium of claim 15, wherein the one or more rules define a second relationship between the at least two user roles and the program code, a third relationship between the at least two user roles and the one or more database tables, or the relationship between the at least two user roles, or a combination thereof, as a second security vulnerability.

17. The non-transitory, computer-readable medium of claim 15, wherein the relationship between the at least two user roles comprises a first user role of the at least two user roles deriving access permissions from a second user role of the at least two user roles.

18. The non-transitory, computer-readable medium of claim 15, wherein the operations comprise receiving a request to scan the program code defining the software application for one or more possible security vulnerabilities.

19. The non-transitory, computer-readable medium of claim 15, wherein the one or more security vulnerabilities comprises a particular user role of the at least two user roles having improperly been granted read permission, write permission, create permission, or delete permission, or a combination thereof, for the one or more database tables.

20. The non-transitory, computer-readable medium of claim 15, wherein the security scan is a static security scan.

\* \* \* \* \*